US008542726B2

(12) United States Patent
Xu et al.

(10) Patent No.: US 8,542,726 B2
(45) Date of Patent: Sep. 24, 2013

(54) DIRECTIONAL AND MOTION-COMPENSATED DISCRETE COSINE TRANSFORMATION

(75) Inventors: Jizheng Xu, Beijing (CN); Feng Wu, Beijing (CN); Hao Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1709 days.

(21) Appl. No.: 11/550,251

(22) Filed: Oct. 17, 2006

(65) Prior Publication Data
US 2008/0089409 A1    Apr. 17, 2008

(51) Int. Cl.
*H04N 11/02*    (2006.01)
(52) U.S. Cl.
USPC ........................................ 375/240; 2/23; 2/26
(58) Field of Classification Search
USPC .................................. 375/240; 382/162–250
See application file for complete search history.

(56) References Cited

U.S. PATENT DOCUMENTS

| | | | |
|---|---|---|---|
| 5,428,693 A * | 6/1995 | Murakami et al. | 382/232 |
| 5,488,419 A * | 1/1996 | Hui et al. | 375/240.17 |
| 5,619,256 A | 4/1997 | Haskell et al. | |
| 5,841,477 A * | 11/1998 | Kim | 375/240.24 |
| 5,883,823 A * | 3/1999 | Ding | 708/402 |
| 5,995,080 A * | 11/1999 | Biro et al. | 345/603 |
| 6,067,322 A | 5/2000 | Wang | |
| 6,529,634 B1 * | 3/2003 | Thyagarajan et al. | 382/239 |
| 6,614,847 B1 * | 9/2003 | Das et al. | 375/240.16 |
| 6,697,100 B2 | 2/2004 | Tatsuzawa | |
| 6,983,017 B2 | 1/2006 | Chen et al. | |
| 6,993,195 B2 | 1/2006 | Olivieri | |
| 7,702,165 B2 * | 4/2010 | Wada | 382/232 |
| 7,822,231 B2 * | 10/2010 | Coimbra et al. | 382/107 |
| 2002/0106027 A1 | 8/2002 | Moon-Ho et al. | |
| 2003/0007698 A1 * | 1/2003 | Govindaswamy et al. | 382/250 |
| 2003/0142743 A1 | 7/2003 | Im | |
| 2004/0010528 A1 * | 1/2004 | Kumar et al. | 708/402 |
| 2004/0151395 A1 | 8/2004 | Kesaniemi et al. | |
| 2004/0228406 A1 | 11/2004 | Song | |
| 2004/0252758 A1 | 12/2004 | Katsavounidis et al. | |
| 2005/0193311 A1 * | 9/2005 | Das et al. | 714/753 |
| 2006/0050783 A1 * | 3/2006 | Le Dinh et al. | 375/240.2 |
| 2006/0062308 A1 * | 3/2006 | Staelin et al. | 375/240.18 |
| 2006/0188013 A1 * | 8/2006 | Coimbra et al. | 375/240.2 |
| 2007/0081735 A1 * | 4/2007 | Wada | 382/251 |
| 2008/0043848 A1 * | 2/2008 | Kuhn | 375/240.16 |

OTHER PUBLICATIONS

Kok, et al., "Image Coding Using DCT of Wavelet Coefficients", retrieved at <<http://ieeexplore.ieee.org/iel2/1030/5785/00274156.pdf?arnumber=274156>>, IEEE, 1992, pp. 475-478.

(Continued)

*Primary Examiner* — William C Vaughn, Jr.
*Assistant Examiner* — Luis M Perez
(74) *Attorney, Agent, or Firm* — Lee & Hayes, PLLC

(57) ABSTRACT

Systems and methods provide directional discrete cosine transformation (DCT) and motion compensated DCT. In one implementation, an exemplary system finds a directional property of an image, such as a visual trend, factorizes a DCT operation into primal operations, and applies the primal operations along a corresponding direction to perform the DCT. Motion compensated DCT applies the primal operations along a motion trajectory of a video sequence. When the directional DCT is applied blockwise, the directional coding modes for adjacent blocks can be optimized in view of each other using a weighted graph to represent the related coding mode decisions.

20 Claims, 16 Drawing Sheets

(56) References Cited

OTHER PUBLICATIONS

Liang, et al., "Fast Multiplierless Approximations of the DCT With the Lifting Scheme", retrieved at <<http://citeseer.ist.psu.edu/cache/papers/cs/28386/http:zSzzSzthanglong.ece.jhu.eduzSzPubzSzbinDCT.pdf/liang01fast.pdf>>, IEEE Transactions on Signal Processing, vol. 49, No. 12, Dec. 2001, IEEE, 2001, pp. 3032-3044.

Monadjemi, "Towards Efficient Texture Classification and Abnormality Detection", retrieved at<<http://www.cs.bris.ac.uk/Publications/Papers/2000192.pdf>>, University of Bristol, Oct. 2004, pp. 198.

Morky, et al., "Minimal Error Drift in Frequency Scalability for Motion-Compensated DCT Coding", retrieved at <<http://ieeexplore.ieee.org/ie14/76/7587/00313134.pdf?isNumber=>>, IEEE Transactions on Circuits and Systems for Video Technology, Aug. 1994, vol. 4, No. 4, IEEE, 1994, pp. 392-406.

\* cited by examiner

FACTORIZATION OF 4-POINT DCT

PARTIAL 4-POINT DCT

ONE OF THE AVAILABLE MODES OF THE BLOCK

WEIGHT(e1)= *performance*(L, m3, m2, m2, m1, m3)

MEANING OF THE EDGE WEIGHT

SPLITING BLOCKS WITH DIFFERENT MODES

DIRECTIONAL AND MOTION-COMPENSATED DISCRETE COSINE TRANSFORMATION

BACKGROUND

The Discrete Cosine Transform (DCT) is widely used in image and video coding. An "n"-point DCT can be expressed as in Equation (1):

$$X[k] = \alpha[k] \sum_{n=0}^{N-1} x[n] \cos\left(\frac{\pi(2n+1)k}{2N}\right) k = 0 \ldots N-1 \quad (1)$$

$$\text{where } \alpha[k] = \begin{cases} \sqrt{\frac{1}{N}} & k = 0 \\ \sqrt{\frac{2}{N}} & k = 1, 2, \ldots, N-1 \end{cases},$$

and where x[n], n=0, ..., N−1 represents the input signal and X[k], k=0, ..., N−1 represents the output DCT coefficient. Theoretically, for a signal that has strong local correlation, DCT approximates the optimal linear transform for de-correlation. In image coding, the image is usually divided into small blocks. A two-dimensional DCT transform, where a one-dimensional transform is performed horizontally and then another one-dimensional transform is performed vertically, is applied to de-correlate the signal within an image block. For example, in JPEG image coding schemata, the image is divided into 8×8 blocks and 8×8 DCT is applied on each block. This is also the case for intra-frame coding in MPEG-1/2/4 and H.261/H.263. In H.264, 4×4 DCT is used instead. There are many fast algorithms for 4×4 or 8×8 DCT.

Although conventional DCT works satisfactorily in image/video coding, it is applied indiscriminately in vertical and horizontal directions regardless of the actual visual characteristics of the image. Most images, however, have a "grain" that does not match the conventional vertical and horizontal DCT directions. That is, images and the blocks constituting an image typically have a directional property resulting from some visual or even non-visual uniformity along one or more axes of the image or block. Conventional DCT does not consider this directional property of images, which is very common in natural images, satellite images, and computer generated images, etc. The directional property is especially evident for visual edges and textures in images.

For those image regions which are not uniform horizontally or vertically and that show a strong uniform directional property along another axis, it is difficult to use a conventional DCT operation to de-correlate them well. To improve performance, one-dimensional DCT could be applied along the direction for which the image region is uniform, but it is not straightforward to perform DCT along an arbitrary direction.

SUMMARY

Systems and methods provide directional discrete cosine transformation (DCT) and motion compensated DCT. In one implementation, an exemplary system finds a directional property of an image, such as a visual trend, factorizes a DCT operation into primal operations, and applies the primal operations along a corresponding direction to perform the DCT. Motion compensated DCT applies the primal operations along a motion trajectory of a video sequence. When the directional DCT is applied blockwise, the directional coding modes for adjacent blocks can be optimized in view of each other using a weighted graph to represent the related coding mode decisions.

This summary is provided to introduce exemplary directional DCT and motion compensated DCT, which is further described below in the Detailed Description. This summary is not intended to identify essential features of the claimed subject matter, nor is it intended for use in determining the scope of the claimed subject matter.

DETAILED DESCRIPTION

Overview

Figure 1:
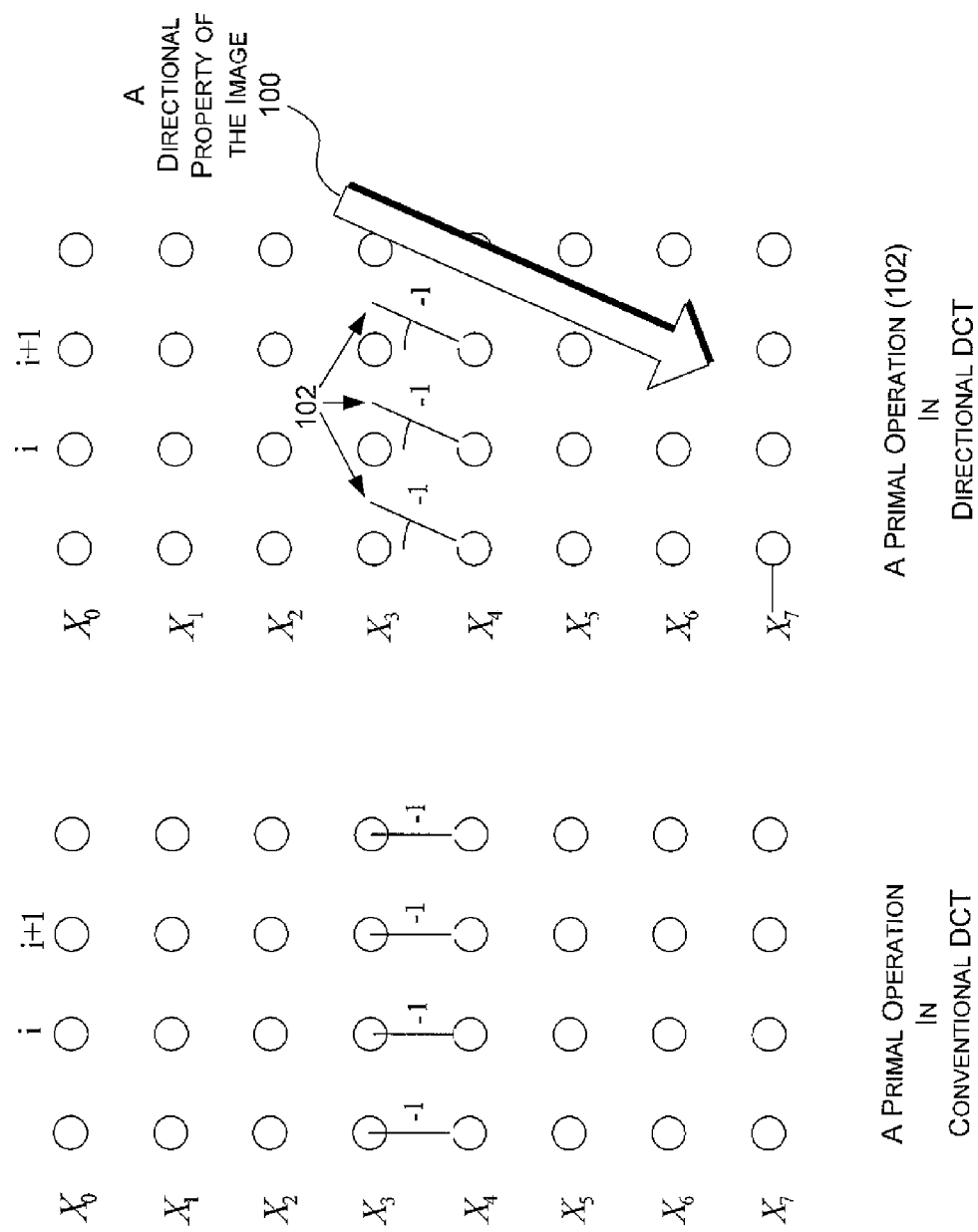
FIG. 1 is a diagram of a primal operation being applied in exemplary directional DCT compared with conventional DCT.

Described herein are systems and methods that perform directional DCT and motion compensated DCT. As shown in FIG. 1, such an exemplary system determines a directional property 100 of an image (represented as a pixel grid) or video sequence (not shown), based on some visual uniformity within the image or a continuity of motion trajectories in the video sequence. The exemplary system factors a DCT operation, such as 8-point DCT, into component operations referred to herein as "primal operations," and then applies each of these primal operations, such as primal operation 102, independently along the determined direction 100, to perform the overall DCT.

In one implementation, a directional property is determined for an image and/or for each block of an image. A direction for applying the primal operations of DCT is selected for each block. Since the direction of DCT application in one block typically affects adjacent blocks, the direction mode for each block can also be optimized in light of the selection of direction modes for adjacent blocks. This may be achieved by using an oriented weighted graph that possesses layers of edges representing a mode decision of a block, the weights of the edges representing coding performance of an adjacent block in a related coding mode decision. By optimizing directional modes of related blocks as a group, the performance of the overall DCT is optimized.

In variations, the exemplary system may apply inverse DCT or partial DCT. Inverse DCT may be achieved by applying the primal operations in an opposite direction. Partial DCT may be achieved by applying only some of the component primal operations of the DCT along the determined direction.

Motion compensated DCT, or a "temporal DCT transform," can be applied in 3-dimensional DCT video coding. For a temporal DCT transform, primal operations of DCT are applied temporally across different video frames. Whereas conventional DCT transforms can only be applied on corresponding co-located pixels among different frames, which is very inefficient, the exemplary motion compensated DCT described herein can be applied along the motion trajectories of a video sequence.

The advantages of directional DCT and motion compensated DCT are many. Each can de-correlate signals along an arbitrary direction or trajectory, making them efficient transforms for many types of image regions, regardless of the direction, or motion trajectory, along which the directional property is uniform.

Exempla System

Figure 2:
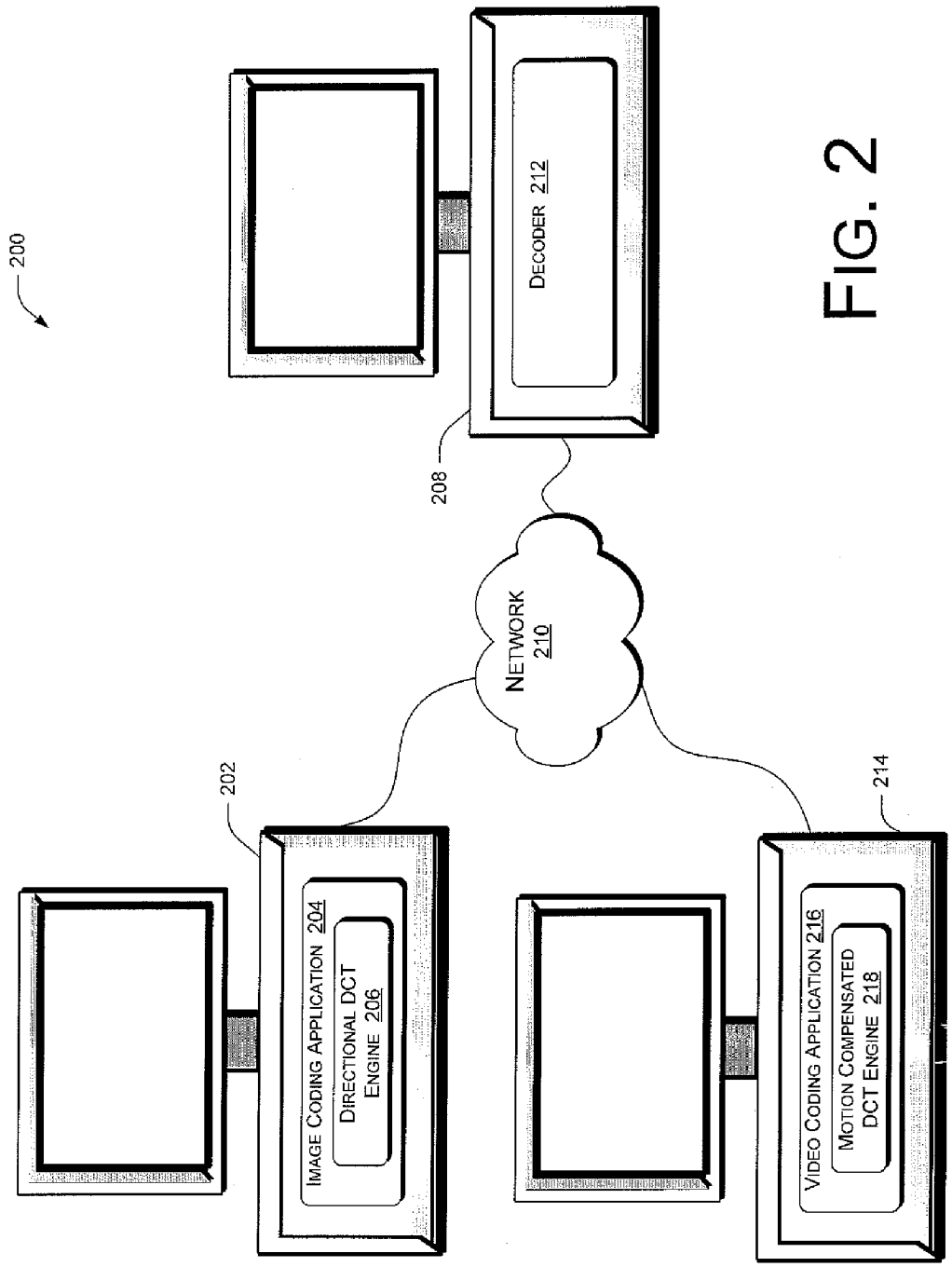
FIG. 2 is a block diagram of an exemplary system for directional DCT and motion compensated DCT.

FIG. 2 shows an exemplary environment 200 for performing directional DCT and/or motion compensated DCT. A first computing device 202 hosts an image coding application 204 that includes an exemplary directional DCT engine 206. The first computing device 202 is communicatively coupled with a second computing device 208, for example, via the Internet or other network 210. The second computing device hosts a decoder 212. The directional DCT engine 206 performs the exemplary DCT on an original image at the first computing device 202 as part of a coding process. At the second computing device 208, the decoder 212 derives a reconstituted original image from the coded image provided by the image coding application 204.

A third computing device 214 is also shown hosting a video coding application 216. The video coding application 216 includes the exemplary motion compensated DCT engine 218. The decoder 212 at the second computing device 208 may obtain an encoded video sequence from the video coding application 216 at the third computing device 214.

Exemplary Engines

Figure 3:
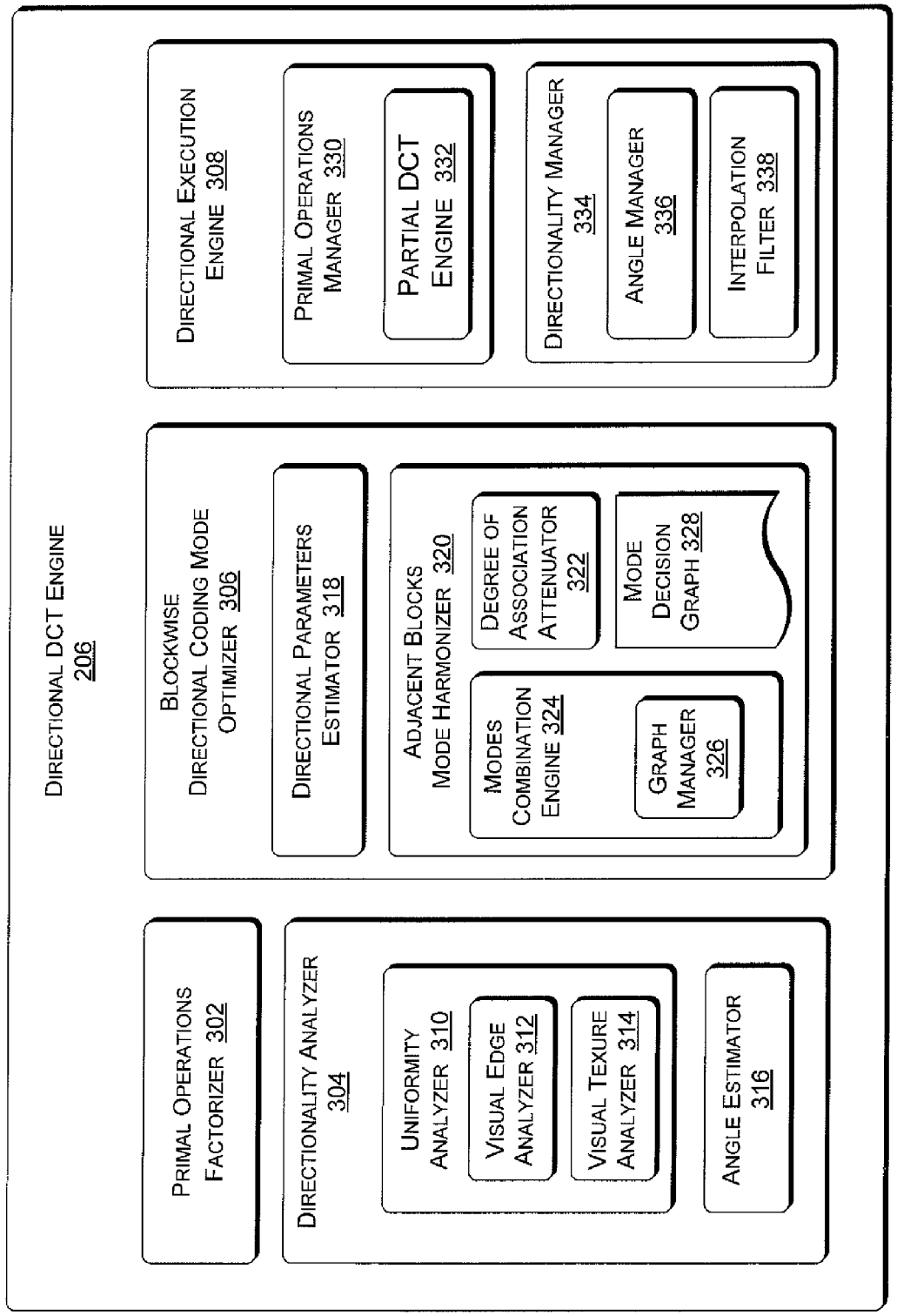
FIG. 3 is a block diagram of an exemplary directional DCT engine.

FIG. 3 shows the exemplary directional DCT engine 206 of FIG. 2 in greater detail. The illustrated implementation is only one example configuration, for descriptive purposes. Many other arrangements of the illustrated components of a directional DCT engine, or similar components, are possible within the scope of the subject matter. Such an exemplary directional DCT engine 206 can be executed in hardware, software, or combinations of hardware, software, firmware, etc.

The exemplary directional DCT engine 206 includes a primal operations factorizer 302, a directionality analyzer 304, a blockwise directional coding mode optimizer 306 and a directional execution engine 308. The directionality analyzer 304 may further include a uniformity analyzer 310 that possesses a visual edge analyzer 312 and a visual texture analyzer 314, and may also include an angle estimator 316 for determining an angle of a direction for applying a DCT primal operation, relative to the vertical (or to the horizontal).

The blockwise directional coding mode optimizer 306 may further include a directional parameters estimator 318 and an adjacent blocks mode harmonizer 320, which in turn may include a degree of association attenuator 322, a modes combination engine 324, a graph manager 326, and access to a buffer for a mode decision graph 328.

The directional execution engine 308 may further include a primal operations manager 330 that also may possess a partial DCT engine 332; and may also include a directionality manager 334 with an angle manager 336 and an interpolation filter 338.

Figure 4:
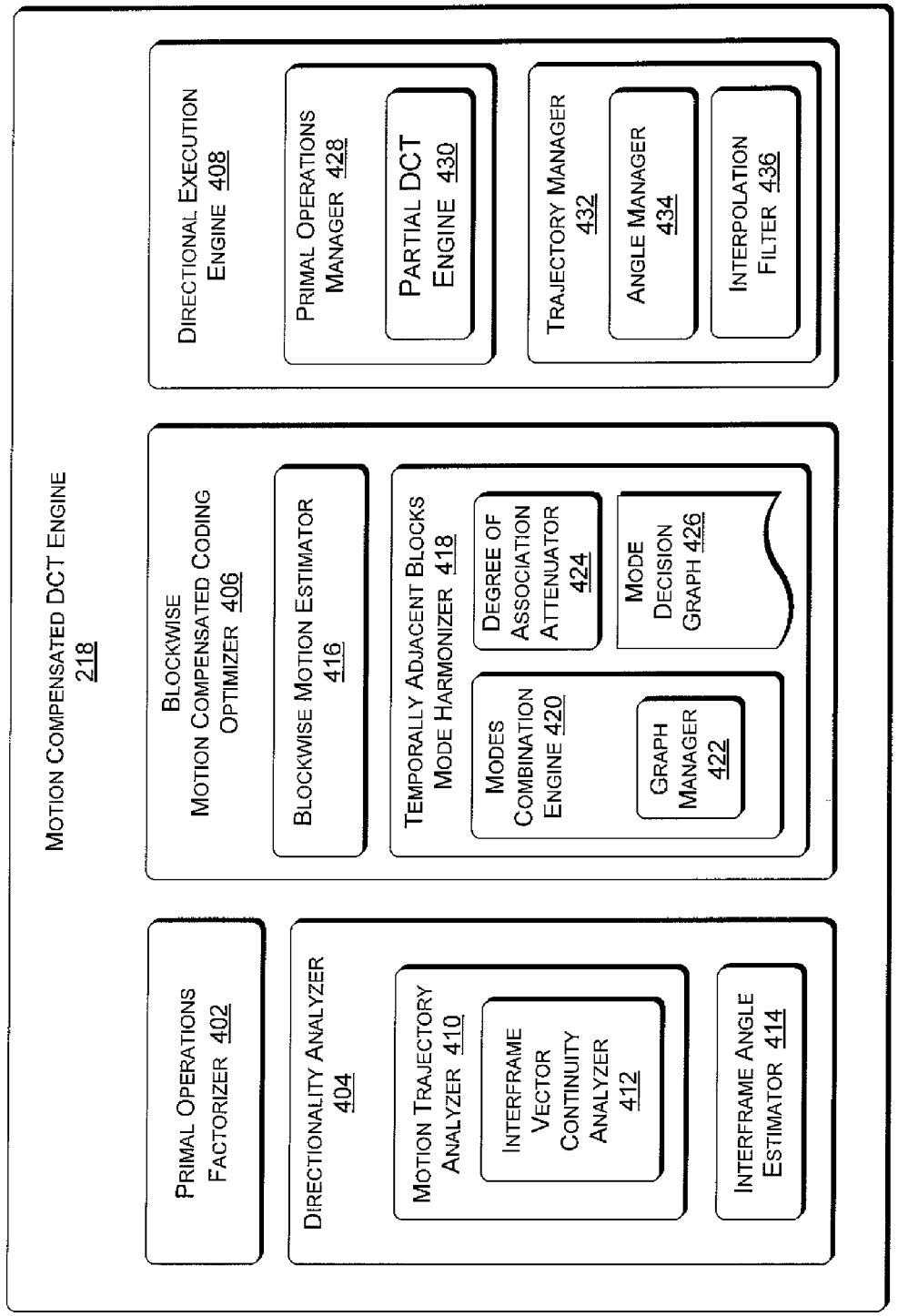
FIG. 4 is a block diagram of an exemplary motion compensated DCT engine.

Similarly, FIG. 4 shows the motion compensated DCT engine 218 of FIG. 1 in greater detail. The numbered components of the illustrated implementation are similar to those of the directional DCT engine 206 of FIG. 3, but the engine of FIG. 4 applies DCT, via primal operations, along interframe motion trajectories instead of along a 2-dimensional direction of an image. The illustrated motion compensated DCT engine 218 is only one example configuration for applying DCT temporally across interframe vectors of a video sequence. Many other arrangements of the illustrated components—or similar components—are possible within the scope of the subject matter. Such an exemplary motion compensated DCT engine 218 can be executed in hardware, software, or combinations of hardware, software, firmware, etc.

The exemplary motion compensated DCT engine 218 includes a primal operations factorizer 402, a directionality analyzer 404, a blockwise motion compensated coding optimizer 406, and a directional execution engine 408. The directionality analyzer 404 may further include a motion trajectory analyzer 410, an interframe vector continuity analyzer 412, and an interframe angle estimator 414 for determining an angle of an interframe vector for applying a DCT primal operation, i.e., where the angle of the interframe vector is measured from an interframe axis perpendicular to the frames that has zero motion across the frames.

The blockwise motion compensated coding optimizer 406 may further include a blockwise motion estimator 416 and a temporally adjacent blocks mode harmonizer 418, for simultaneously optimizing directional modes across groups of temporally adjacent blocks. The mode harmonizer 418 may in turn include a modes combination engine 420, a graph manager 422, a degree of association attenuator 424, and access to a buffer for holding a mode decision graph 426.

The directional execution engine 408 may further include a primal operations manager 428 that may include a partial DCT engine 430; and may also include a trajectory manager 432 that may have an angle manager 434 and an interpolation filter 436.

Operation of the Exemplary Engines

Figure 5:
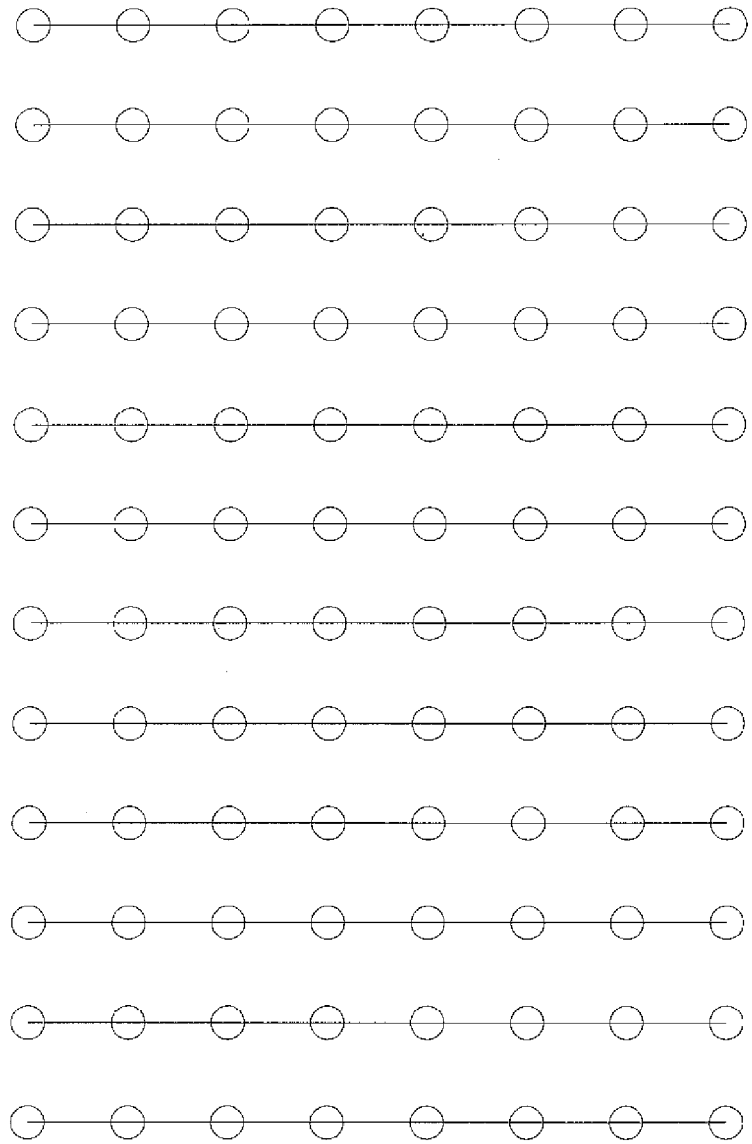
FIG. 5 is a diagram of conventional 8-point DCT transformation on 8 rows of image signal pixels.

In conventional DCT techniques, 8-point DCT is applied on image rows, for example, on 8 pixels vertically, as shown in FIG. 5. Each vertical line represents a set of 8 pixels on which vertical 8-point DCT is applied.

In one implementation of the directional DCT engine 206, the primal operations factorizer 302 separates 8-point DCT into 35 primal operations, as given in Equation (2):

$$DCT_8(X) = O_{35} \circ O_{34} \circ \ldots \circ O_2 \circ O_1(X). \tag{2}$$

Figure 6:
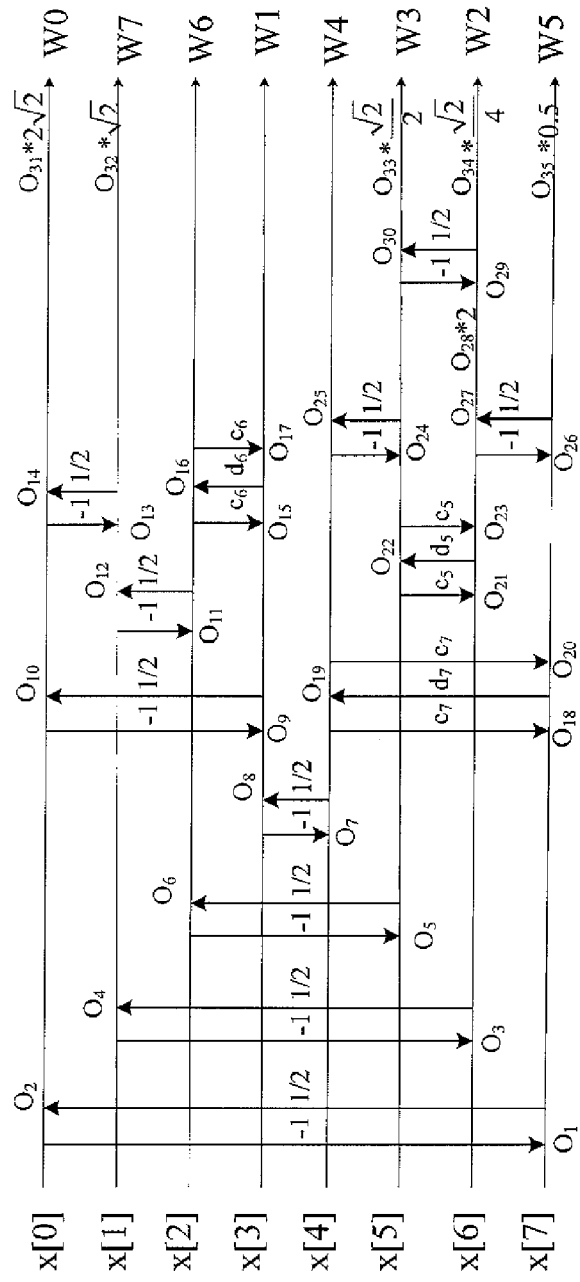
FIG. 6 is a diagram of factorizing a DCT operation into primal operations.

FIG. 6 shows the factorization of 8-point DCT into these primal operations. The terms $x_i$, where $i=0\ldots,7$ are input signals, and $W_i$, where $i=0,\ldots,7$ are output DCT coefficients. In FIG. 6, each arrowed line illustrates a primal operation and the number beside each line is the parameter for that primal operation. Thus, if there is an arrowed line from $X_i$ to $X_j$, with a parameter a, the associated primal operation can be expressed as in Equation (3):

$$X_j = X_j + aX_i. \tag{3}$$

The inverse operation is defined as in Equation (4):

$$X_j = X_j + (-a)X_i. \tag{4}$$

Next, it is easy to derive the primal operations for an inverse 8-point DCT transform, as shown in Equation (5):

$$DCT_8^{-1}(X) = O_1^{-1} \circ O_2^{-1} \circ \ldots \circ O_{34}^{-1} \circ O_{35}^{-1}(X). \tag{5}$$

The term $O_i^{-1}$ is the inverse operation of $O_i$. Both $O_i^{-1}$ and $O_i$ are from $X_i$ to $X_j$, but their parameters have opposite signs.

Let $I(i, j)$ denote the pixel at row i and column j; then for column j, a primal operation between row 3 and row 4 (as shown previously in the left-hand side of FIG. 1) is given by Equation (6):

$$I(4,j) = I(4,j) - I(3,j). \tag{6}$$

The directional execution engine 308 performs DCT along a given direction by applying each primal operation along that direction. In one scenario the direction to apply DCT is determined at least in part by the uniformity analyzer 310. The uniformity analyzer 310 may possess the visual edge analyzer 312 and the visual texture analyzer 314 to apply known techniques for determining visual uniformity within an image based on a visual edge or the direction of the grain of a texture. There may be other non-visual cues, microscopic cues, or mathematical metrics in an image that instead may be used to determine a direction to apply the directional DCT. As shown on the right-hand side of FIG. 1, if the direction is θ=arctan (0.5) from the vertical direction, then I(4,j) corresponds to the middle position between I(3, j) and I(3, j+1), denoted as I(3, j+0.5). The value of I(3, j+0.5) does not exist in the image but can be interpolated using neighboring pixels, as shown by Equation (7):

$$I(3, j+0.5) = \sum_{k=-K1}^{K2} f(k) I(3, j+k), \tag{7}$$

where f(k) is a given interpolation filter 338 in the directionality manager 334. The indexes K1 and K2 delimit the finite support of the interpolation filter 338. For example, if the interpolation filter 338 uses bilinear interpolation, then in Equation (8):

$$I(3, j+0.5) = \frac{1}{2} I(3, j) + \frac{1}{2} I(3, j+1). \tag{8}$$

Then, the primal operation along that direction is shown by Equation (9):

$$I(4, j) = I(4, j) - I(3, j+0.5) = I(4, j) - \frac{1}{2}I(3, j) - \frac{1}{2}I(3, j+1). \tag{9}$$

In general, the primal operations manager 330 can apply a primal operation from row $i_1$ to row $i_2$ with parameter a along a given direction θ, according to Equation (10):

$$I(i_2, j) = I(i_2, j) + a \times I(i_1, j + (i_2 - i_1) \times (\theta)) \tag{10}$$

where tan( ) is the tangent function. And if $I(i_1, j + (i_2 - i_1) \times (\theta))$ does not locate at an integer position, the interpolation filter 338 can interpolate it from neighboring pixels. The inverse operation is described by Equation (11):

$$I(i_2, j) = I(i_2, j) + (-a) \times I(i_1, j + (i_2 - i_1) \times (\theta)). \tag{11}$$

The difference between Equation (11) and Equation (10) is merely the positive or negative signs of the parameters. In terms of the angle estimator 316 and the angle manager 336, by introducing angle parameter θ in each primal operation, the directional DCT engine 206 can perform both DCT transforms and inverse DCT transforms along a direction defined by the given angle.

In the motion compensated DCT engine 218, similar operations as above are implemented in temporal DCT transforms. Such exemplary temporal DCT is referred to herein as "motion-compensated DCT" because the corresponding directional execution engine 408 performs it along motion trajectories of a video sequence.

Let $I_t(i, j)$ denote an $(i, j)$ pixel at frame t. Suppose a primal operation is from frame $t_1$ to frame $t_2$, with a parameter a. In one implementation the corresponding primal operations factorizer 402 determines a primal operation of motion compensated DCT as in Equation (12):

$$I_{t_2}(i,j) = I_{t_2}(i,j) + a \times I_{t_1}(i + \delta i, j + \delta j), \tag{12}$$

where the motion trajectory analyzer 410 finds that (δi, δj) is a motion vector from frame $t_1$ to frame $t_2$. The inverse primal operation is given in Equation (13):

$$I_{t_2}(i,j) = I_{t_2}(i,j) + (-a) \times I_{t_1}(i + \delta i, j + \delta j). \tag{13}$$

When the directionality analyzer 404 makes use of Equations (12) and (13), the motion compensated DCT engine 218 can perform motion-compensated DCT and inverse motion compensated DCT along motion trajectories.

Figure 7:
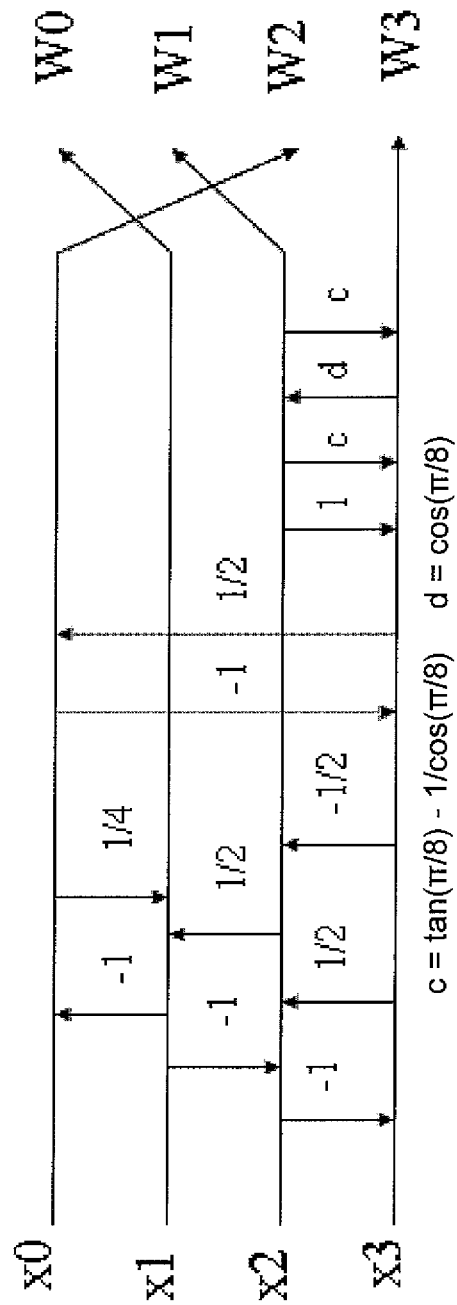
FIG. 7 is a block diagram of factorizing 4-point DCT into primal operations.
Figure 8:
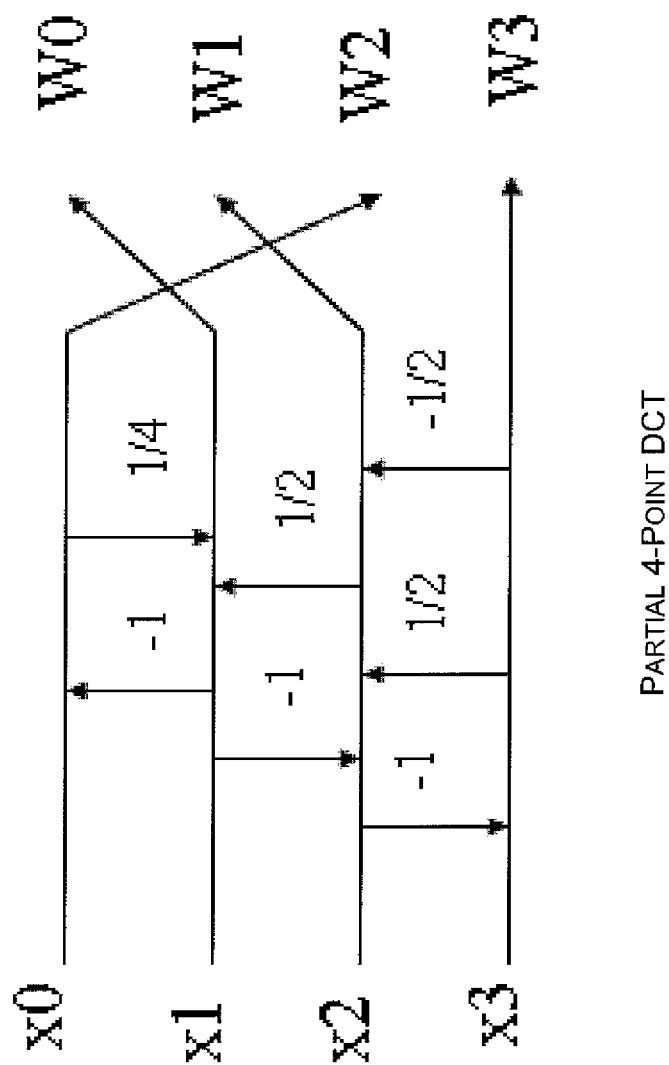
FIG. 8 is a diagram of exemplary partial 4-point DCT.

In a variation, the primal operations factorizer 302 (or 402) may give the factorization of 4-point DCT, as shown in FIG. 7. Additionally, in one implementation, the partial DCT engine 332 (or 430) can skip some primal operations, resulting in a partial DCT, as shown in FIG. 8. Using an exemplary engine (206 or 218) that performs partial directional DCT or partial motion compensated DCT can simplify coder design and boost performance.

Blockwise Direction Estimation and Motion Estimation

The blockwise directional coding mode optimizer 306 and the blockwise motion compensated coding optimizer 406 are rate-distortion optimized to estimate, respectively, directional and motion parameters for each block. Further, these directional and motion parameters can be coded and transmitted to the decoding side 212 for perfect reconstruction of the original image or video sequence. The following description explains the exemplary coding mode optimizers 306 and 406 using 8×8 DCT along a determined direction, as an example.

Figure 9:
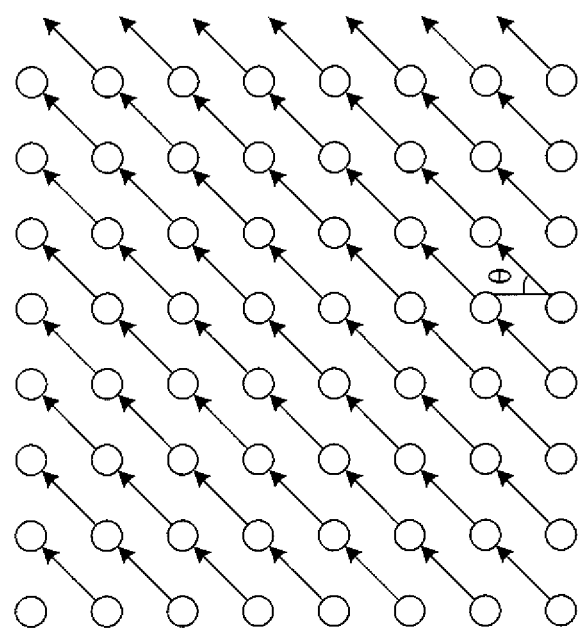
FIG. 9 is a diagram of one exemplary directional mode for applying directional DCT.
Figure 10:
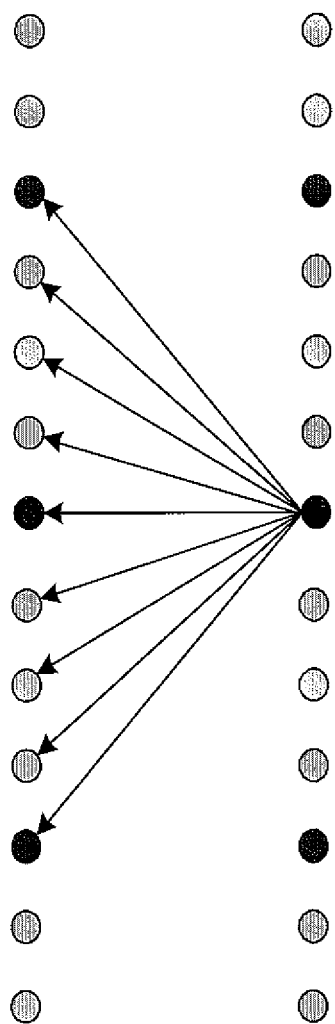
FIG. 10 is a diagram of nine available modes of an exemplary implementation of directional DCT.

In image coding, each 8×8 block has its own directional mode, e.g., an up-to-the-right direction as shown in FIG. 9. The directional execution engine 308 applies lifting steps of the directional DCT according to the directional mode for the current block. For example, in one implementation, the directional parameters estimator 318 may define nine modes for directional DCT, depicted in FIG. 10. Since the directional DCT is not restricted or isolated within a single block, the mode decisions made by the directional parameters estimator 318 for neighboring blocks usually influences the transform operations of the current block—i.e., in general the directional modes of adjacent blocks influence each other. Thus, the adjacent blocks mode harmonizer 320 finds the optimal directional modes for the blocks which are mutually related, so that the optimal overall coding performance can be ensured or improved.

In one implementation, the available directions are all between −45° and +45° (from the standard vertical direction) and the mode decision selected by the mode harmonizer 320 for one block is only influenced by the modes selected for four of its neighbors, as in Equation (14):

$$\text{Performance}[i]=f(\text{mode}[i-2],\text{mode}[i-1],\text{mode}[i],\\ \text{mode}[i+1],\text{mode}[i+2]) \quad (14)$$

Here, performance[i] is the coding performance of the i'th block, and mode[i] is the mode selected for the i'th block.

Figure 11:
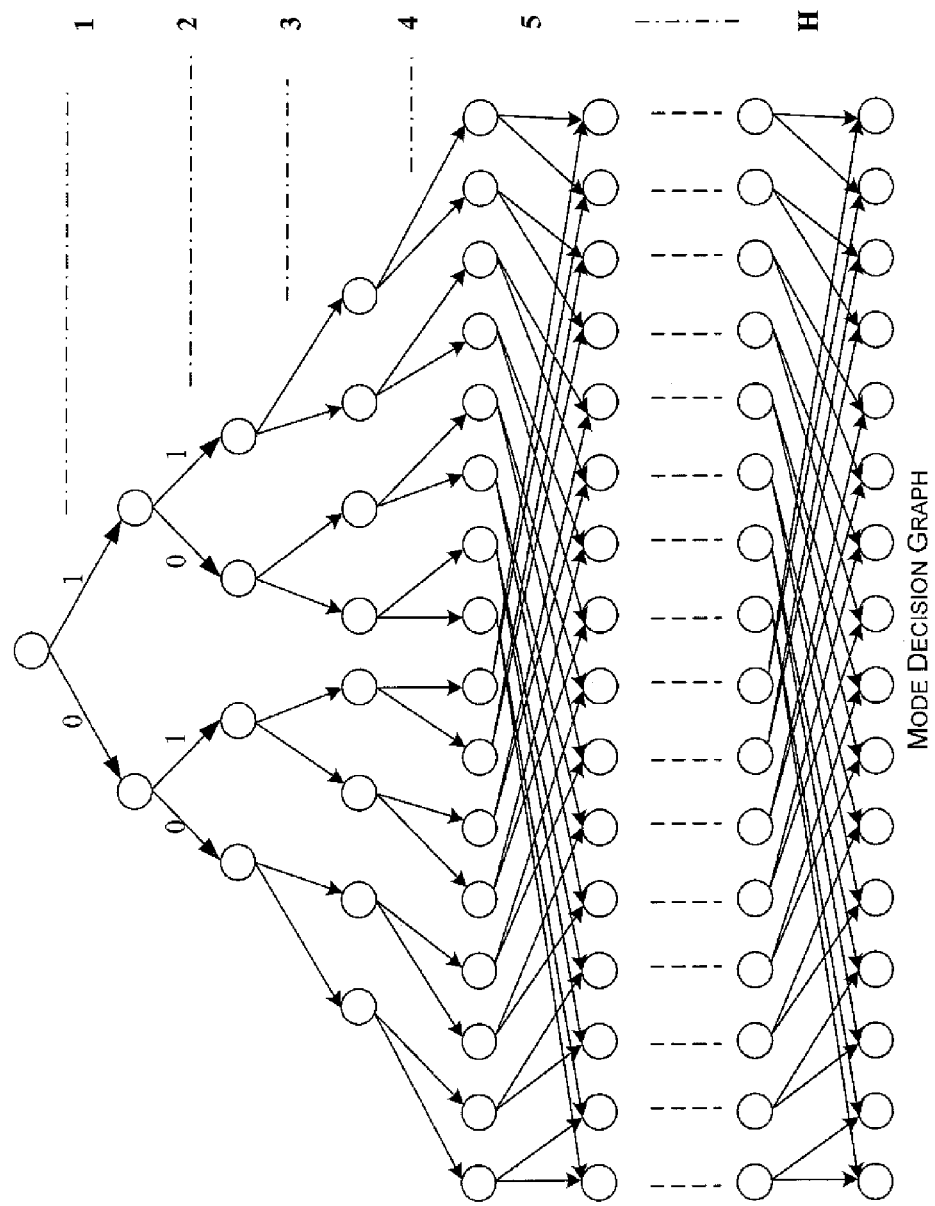
FIG. 11 is a diagram of an exemplary mode decision graph.
Figure 12:
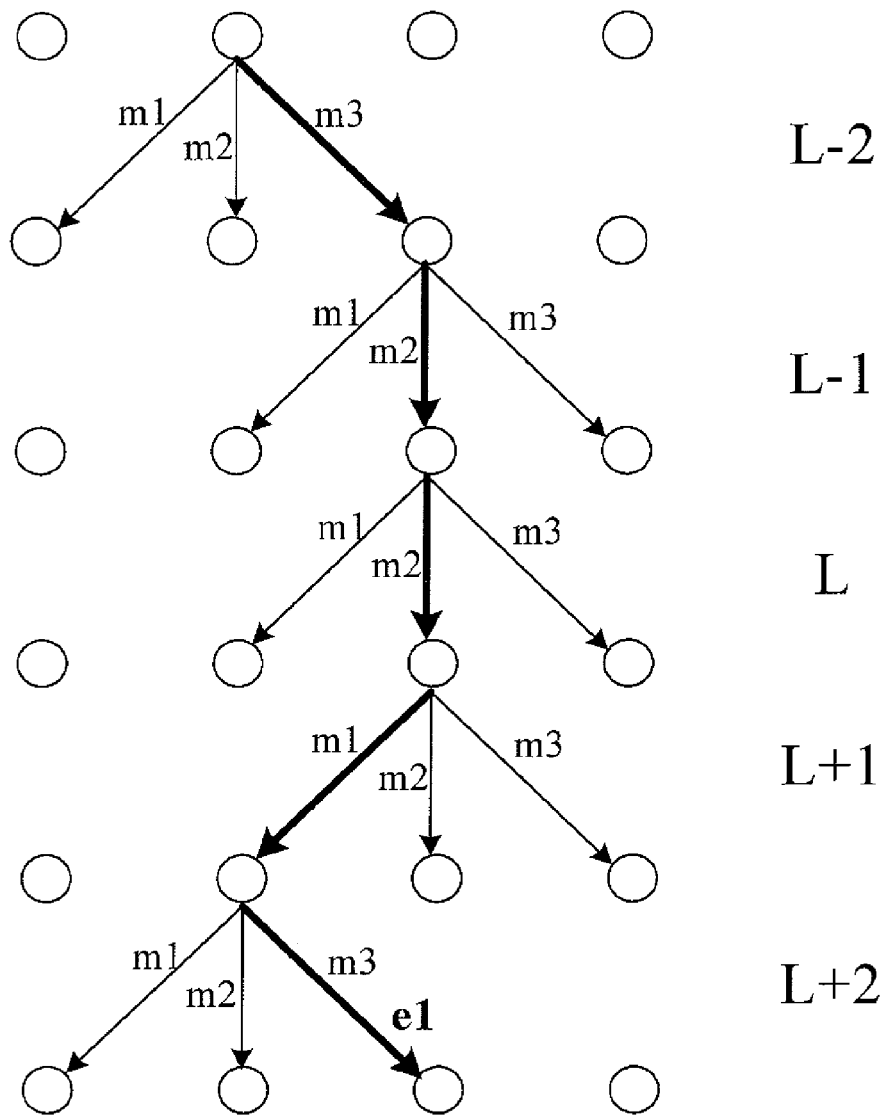
FIG. 12 is a diagram of the meaning of edge weights in the exemplary mode decision graph of FIG. 11.

A modes combination engine 324 in the mode harmonizer 320 may use a weighted graph to optimize direction modes among related blocks. In such an implementation, a graph manager 326 represents the mode decision by an oriented weighted graph as in FIG. 11. In the illustrated graph, H is the number of blocks per row, and the number of available modes is two. Thus, the graph has H layers of edges, where the edges of the i'th layer represent the mode decision made by the i'th block. The weights of the edges of the i'th layer represent the coding performance of the (i−2)'th block in the related mode selection situation, depicted by FIG. 12. The modes combination engine 324 finds the shortest weighted path from the top layer to the bottom layer to obtain the optimal directional modes combination. In one implementation, the mode harmonizer 320 finds direction modes for adjacent blocks by applying the following example programming:

```
/*dynamic programming for the adjacent blocks mode harmonizer 320
*input : the mode decision graph 328 (oriented weighted
graph 'Node[ ][ ]')
*output : optimal modes of these blocks 'ModeList[ ]'
*/
For L= LayerDepth to 0   //from bottom layer to top layer
    For N=0 to NodeNumber //for all nodes in this layer
        //initiate the vars
        CurNode = Node[L][N];
        MinCost = INFINITE;
        For M=0 to ModeNumber    //for all the sub-nodes of the
        current node
            SubNode = CurNode.sub[M];
            SubCost = SubNode.mincost;
            EdgeCost = CurNode.edgecost[M];
            //the min-cost of the current node for selecting mode[M] is
            //the edge-weight[M] added sub-node[M].min-cost
            Cost = SubCost + EdgeCost;
            //record the min-cost of current node and the related sub-node
            If Cost < MinCost then
                MinCost = Cost;
                BestSub = SubNode;
        CurNode.MinCost = MinCost;
        CurNode.BestSub = SubNode;
        Node[L][N] = CurNode;
//find the optimal path from top layer down to the bottom layer
M = 0;
For L = 0 to LayerDepth
    M = Node[L][M].BestSub;
    ModeList[L] = M;
Return ModeList;
```

The calculation complexity of the foregoing programming example is O(LayerDepth*NodeNumber*ModeNumber), that is $O(H*K^5)$, where H is the number of blocks per row and K is the number of available modes.

In order to build one implementation of the mode decision graph 328, the $H*K^5$ edge weights are all valued. Obtaining each edge weight can involve a series of intensive steps, such as encoding, reconstructing, and calculating distortion, that require significant computation The "degree of association" attenuator 322 can simplify construction of the mode decision graph 328 by reducing the association degree among neighboring blocks, as given in Equation (15):

$$\text{Performance}[i]=f(\text{mode}[i-1],\text{mode}[i],\text{mode}[i+1]), \quad (15)$$

so that the number of the edges is reduced to $O(H*K^3)$.

The mode harmonizer 320 may further reduce the computation requirement by dividing the combinations of $K^3$ different modes of three contiguous blocks into four categories. Assuming the three blocks m1, m2, m3, then the four categories are:
1. m1 is equal to m2, m2 is equal to m3
2. m1 is equal to m2, m2 is NOT equal to m3
3. m1 is NOT equal to m2, m2 is equal to m3
4. m1 is NOT equal to m2, m2 is NOT equal to m3

Figure 13:
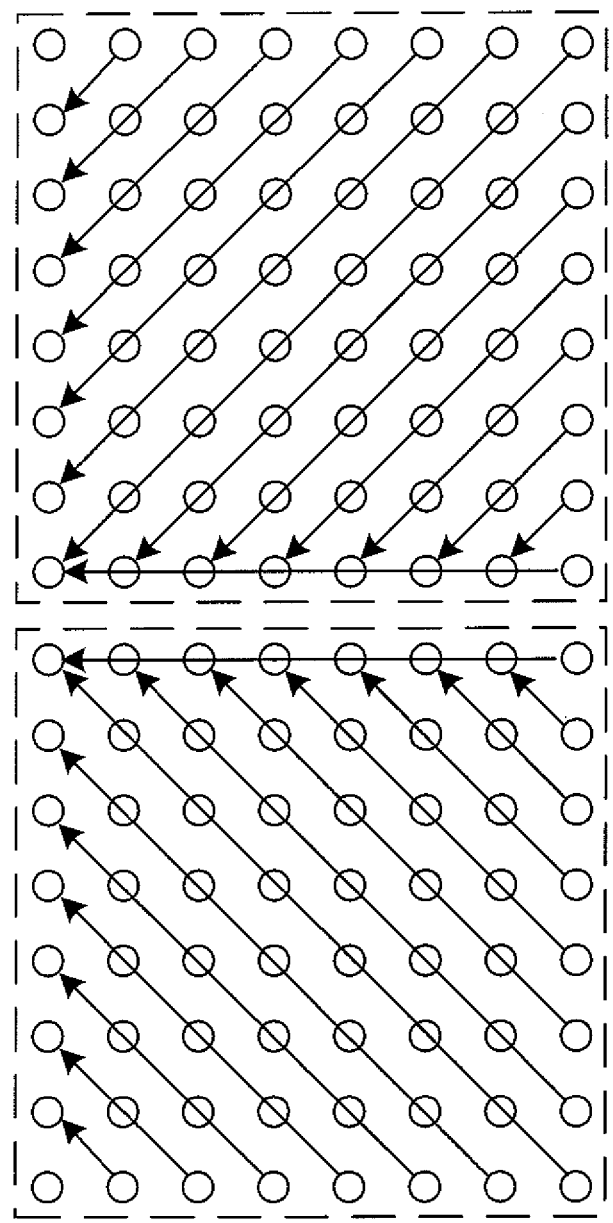
FIG. 13 is a diagram of exemplary splitting blocks with different directional modes.

The modes combination engine 324 allows the cases that fall into the same category to share the same edge weight, e.g., by forcibly splitting the blocks that have different modes, as shown in FIG. 13, so that the total number of weights is reduced to H*4*K.

Exemplary Methods

Figure 14:
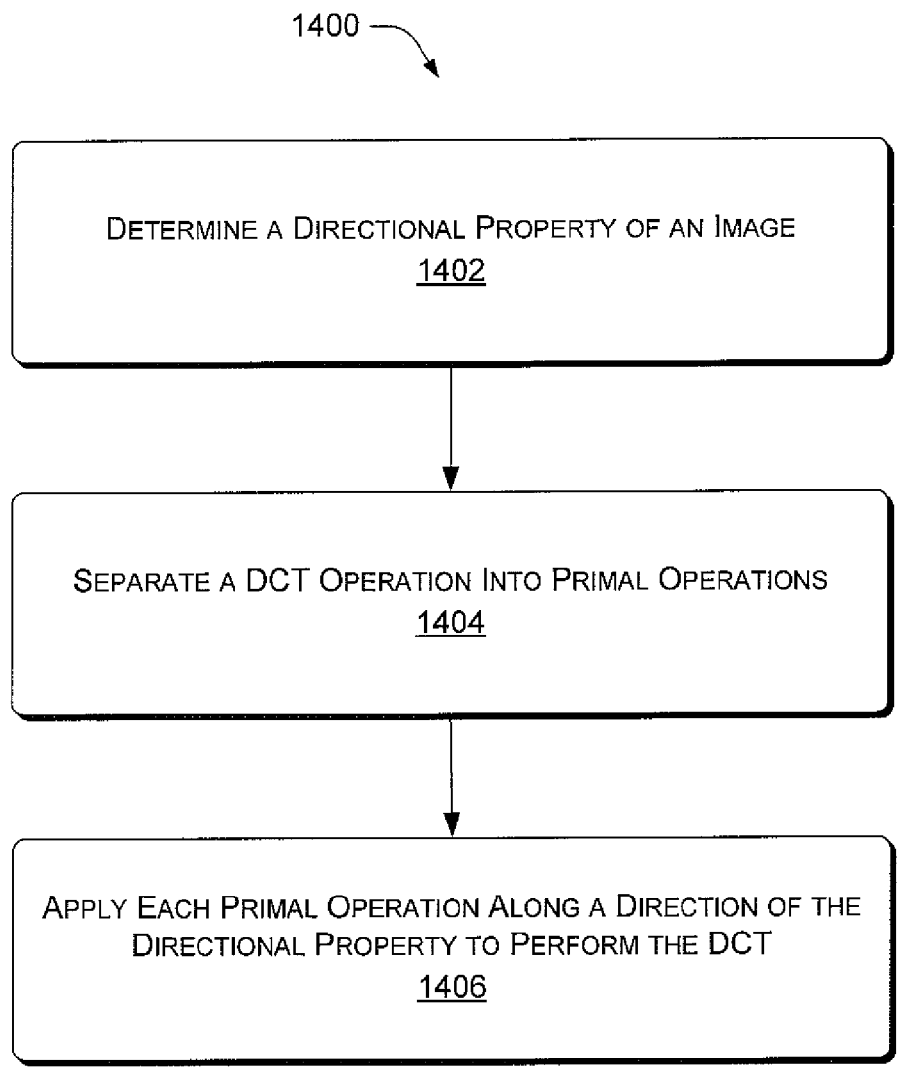
FIG. 14 is a flow diagram of an exemplary method of performing directional DCT.

FIG. 14 shows an exemplary method 1400 of performing directional DCT. In the flow diagram, the operations are summarized in individual blocks. The exemplary method 1400 may be performed by hardware, software, or combinations of hardware, software, firmware, etc., for example, by components of the exemplary directional DCT engine 206.

At block 1402, a directional property of an image is determined. The directional property may be based on a visual characteristic of the image, such as a uniform edge or texture grain. Or, the direction may be based on a micropattern, mathematical uniformity, or a non-visual metric. Applying DCT in the determined uniform direction or trend simplifies processing, and boosts performance.

At block 1404, a DCT operation to be applied is separated into component, primal operations. The number of points in a selected pixel matrix may determine the number of primal operations. However, not all the primal operations that have been determined need be applied. Partial DCT can be achieved by applying only some of the primal operations, to save computing costs and boost performance.

At block 1406, primal operations are applied along a direction of the directional property, in order to perform the DCT. In a typical implementation, the image is divided into blocks, and a direction mode is selected for each block. The direction mode selected for one block may influence the direction mode that is selected for its neighboring blocks in the image.

Figure 15:
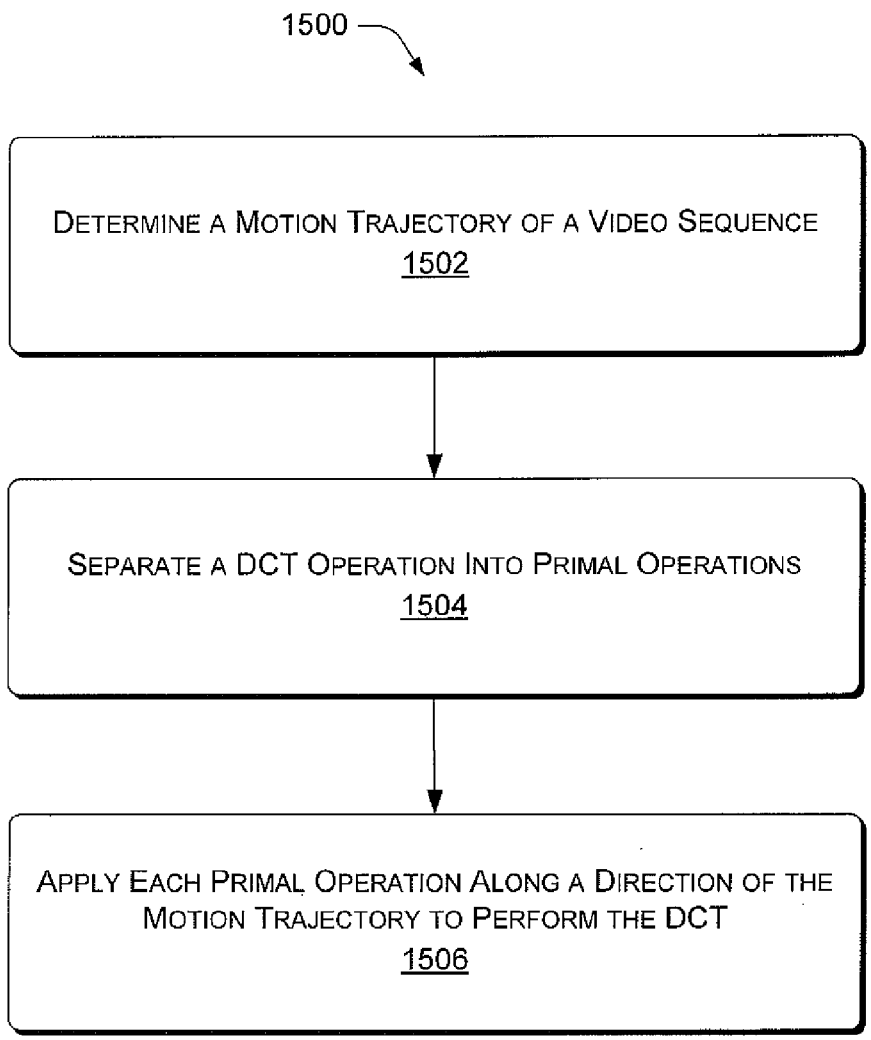
FIG. 15 is a flow diagram of an exemplary method of performing motion compensated DCT.

FIG. 15 shows an exemplary method 1500 of performing motion compensated DCT. In the flow diagram, the operations are summarized in individual blocks. The exemplary method 1500 may be performed by hardware, software, or combinations of hardware, software, firmware, etc., for example, by components of the exemplary motion compensated DCT engine 218.

At block 1502, a motion trajectory is determined in a video sequence. The determined or discovered motion trajectory is analogous to the directionality determined in the above exemplary method 1400 for performing directional DCT. Suitable motion vectors for motion estimation or prediction are available to most known video coders, and these can be used for applying the exemplary motion compensated DCT.

At block 1504, a DCT operation to be applied is separated into component primal operations. The factorization of the DCT operation into primal operations is analogous to that for direction DCT in the preceding exemplary method 1400.

At block 1506, each primal operation is applied along a direction of the motion trajectory, in order to perform the DCT, i.e., each primal operation to be applied is applied frame-to-frame across the video sequence, temporally.

Figure 16:
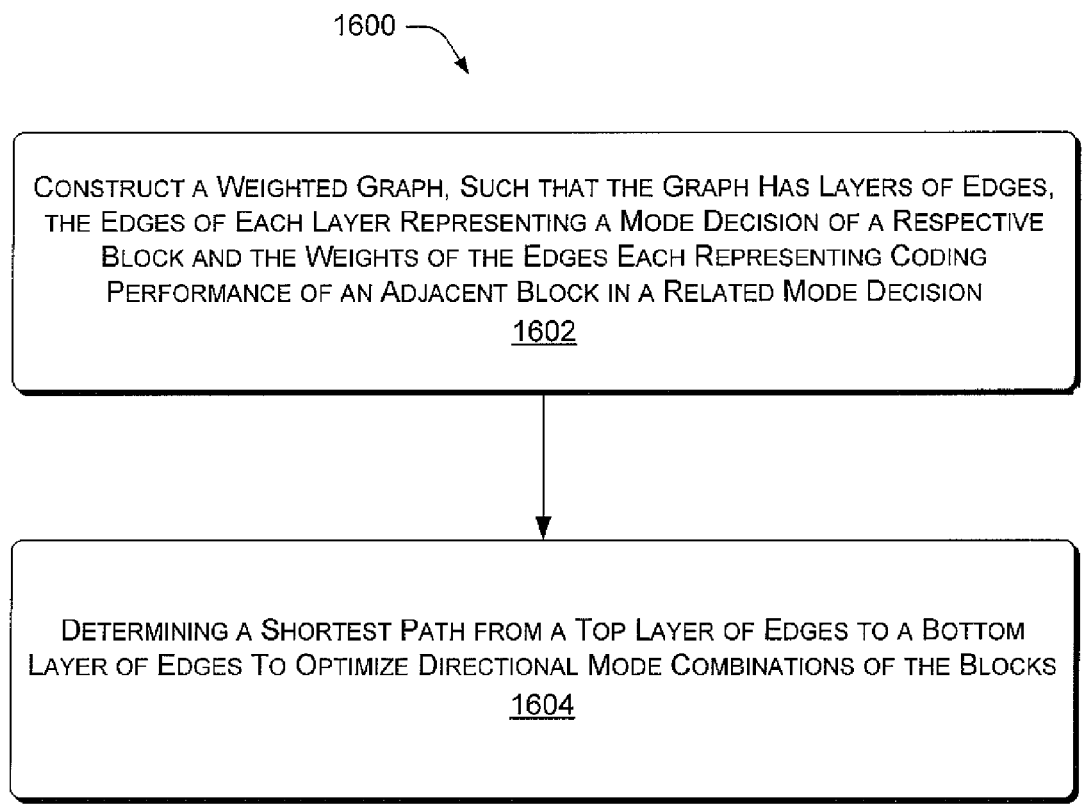
FIG. 16 is a flow diagram of an exemplary method of optimizing selection of direction modes among a group of adjacent image blocks that influence each other's directional coding mode decision.

FIG. 16 shows an exemplary method 1600 of optimizing selection of direction modes across a group of adjacent image blocks that influence each other's selection of a direction mode. In the flow diagram, the operations are summarized in individual blocks. The exemplary method 1600 may be performed by hardware, software, or combinations of hardware, software, firmware, etc., for example, by components of an exemplary mode harmonizer 320 (or 418).

At block 1602, a weighted graph is constructed to model the direction mode decision making for adjacent blocks. Such a graph has layers of edges, with each layer representing a mode decision of a respective block. The weights of the edges each represent the coding performance of an adjacent block in a related direction mode decision.

At block 1604, by determining a shortest weighted path from the top layer of edges to a bottom layer of edges in the graph, the directional mode combination for a group of adjacent blocks, e.g., three contiguous blocks, may be determined in a manner that optimizes performance.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
    determining a directional property of one or more images to be processed with a discrete cosine transform (DCT) operation,
    the determining the directional property including determining a direction for a current block of an image based at least in part on one or more directions determined for one or more adjacent blocks of the current block,
    the determining the direction for the current block of the image including constructing an oriented weighted graph that possesses one or more layers of one or more edges,
    the one or more edges of each layer representing a directional mode decision of a block and one or more weights of the one or more edges each representing a performance of an adjacent block in a related directional mode decision;
    separating the DCT operation into one or more DCT primal operations;
    determining an angle of the direction for applying a respective DCT primal operation of the one or more DCT primal operations; and
    applying at least the respective DCT primal operation along the angle of the direction of the directional property to perform the DCT operation.

2. The method as recited in claim 1, wherein determining the directional property further includes determining a motion trajectory over multiple frames of a video sequence.

3. The method as recited in claim 1, wherein determining the directional property further includes determining a direction for each block of the image.

4. The method as recited in claim 1, wherein determining the direction for the current block of the image includes finding an optimal direction mode for the current block based on finding optimal direction modes for the adjacent blocks.

5. The method as recited in claim 1, further comprising determining a shortest path from a top layer of edges to a bottom layer of edges to optimize directional mode combinations for the adjacent blocks.

6. The method as recited in claim 1, wherein the direction of the current block is based at least in part on directions determined for the adjacent blocks and a degree of association between the current block and the adjacent blocks is adjustable.

7. The method as recited in claim 1, wherein determining the directional property further includes performing blockwise motion estimation over frames of a video sequence.

8. The method as recited in claim 1, further comprising using an interpolation to create a logical position in a row of pixels for applying the respective DCT primal operation.

9. A discrete cosine transform (DCT) engine, comprising:
    under a control of one or more computing devices,
        a primal operations engine that separates a discrete cosine transform (DCT) operation into one or more DCT primal operations;
        a directionality analyzer that determines a direction for a current block of an image based at least in part on one or more directions determined for one or more adjacent blocks of the current block,
        constructs an oriented weighted graph that possesses one or more layers of one or more edges, the one or more edges of each layer representing a directional mode decision of a block and one or more weights of the one or more edges each representing a performance of an adjacent block in a related directional mode decision;
        an angle estimator that determines an angle of the direction for applying a respective DCT primal operation of the one or more DCT primal operations; and
        a directional execution engine that applies at least the respective DCT primal operation along the angle of the direction corresponding to a directional property.

10. The DCT engine as recited in claim 9, wherein the directionality analyzer further determines a direction corresponding to an inverse DCT.

11. The DCT engine as recited in claim 9, further comprising a blockwise directionality coding mode analyzer that determines a direction for applying the respective DCT primal operation to each block of the image.

12. The DCT engine as recited in claim 11, further comprising a coding mode harmonizer that determines directional coding modes for a given block and the adjacent blocks such that the overall coding performance of the DCT is increased.

13. The DCT engine as recited in claim 9, wherein the directionality analyzer further determines a direction based on a uniformity of a visual edge of the image or on a uniformity of a textural visual feature of the image.

14. The DCT engine as recited in claim 9, wherein the directionality analyzer further determines a directional property based on an interframe motion trajectory of a video sequence.

15. A method comprising:
    under a control of one or more computing devices,
        determining a directional property of one or more blocks within an image, the determining including:
        determining a direction for a current block of the image based at least in part on one or more directions determined for one or more adjacent blocks of the current block; and
        constructing an oriented weighted graph that possesses one or more layers of one or more edges, the one or more edges of each layer representing a directional mode decision of a block and one or more weights of the one or more edges each representing a performance of an adjacent block in a related directional mode decision;

factorizing a discrete cosine transform (DCT) operation into one or more DCT primal operations;

determining an angle of the direction for applying a respective DCT primal operation of the one or more DCT primal operations; and applying at least the respective DCT primal operation along the angle of the direction corresponding to the directional property.

16. The method as recited in claim 1, further comprising independently applying at least some of the one or more DCT primal operations to perform the DCT operation.

17. The DCT engine as recited in claim 9, wherein the directional execution engine further independently applies at least some of the one or more DCT primal operations to perform the DCT operation.

18. The method as recited in claim 15, further comprising independently applying at least some of the one or more DCT primal operations to perform the DCT operation.

19. The method as recited in claim 15, wherein determining the directional property further includes determining a motion trajectory over multiple frames of a video sequence.

20. The method as recited in claim 15, wherein determining the directional property further includes performing block-wise motion estimation over frames of a video sequence.

\* \* \* \* \*